No. 713,182. Patented Nov. 11, 1902.
F. L. O. WADSWORTH.
PRISMATIC FIREPROOF STRUCTURE.
(Application filed May 27, 1899.)

(No Model.) 3 Sheets—Sheet 1.

Witnesses
J. G. Hinkel
Arthur A. Fisher

Inventor
F. L. O. Wadsworth
by Foster & Freeman
Attorneys

No. 713,182. Patented Nov. 11, 1902.
F. L. O. WADSWORTH.
PRISMATIC FIREPROOF STRUCTURE.
(Application filed May 27, 1899.)
(No Model.) 3 Sheets—Sheet 2.

Witnesses
Inventor
F. L. O. Wadsworth
Attorneys

No. 713,182. Patented Nov. 11, 1902.
F. L. O. WADSWORTH.
PRISMATIC FIREPROOF STRUCTURE.
(Application filed May 27, 1899.)
(No Model.) 3 Sheets—Sheet 3.
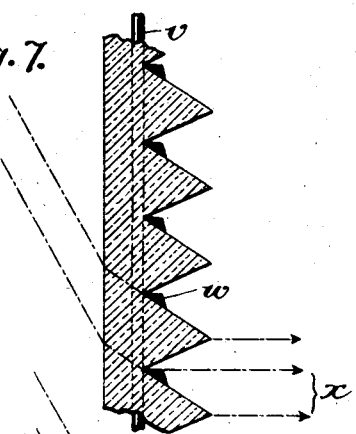
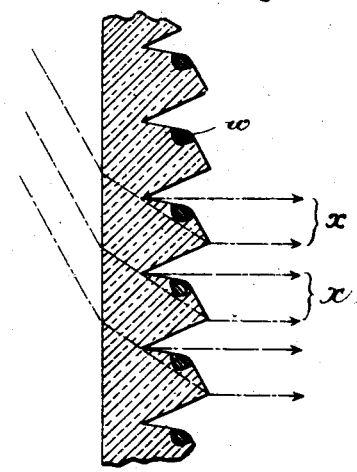
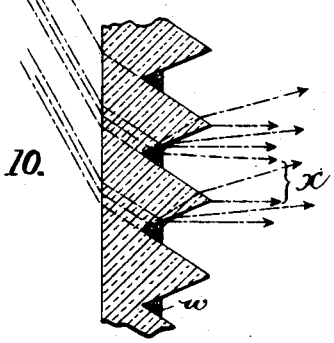
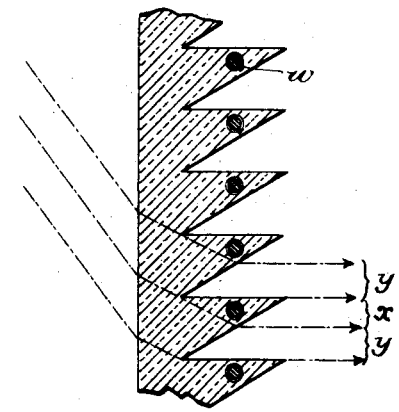
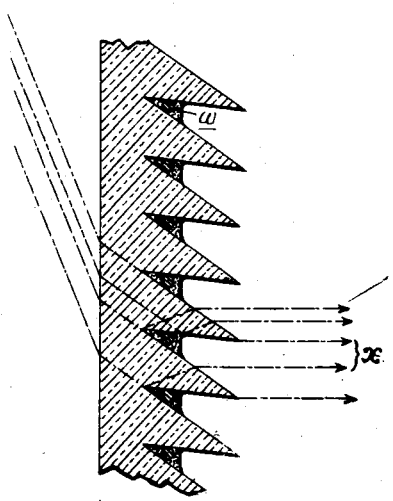
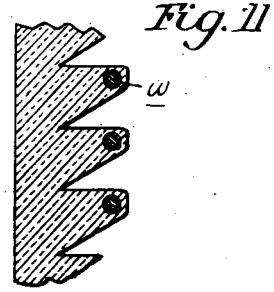

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, OF CHICAGO, ILLINOIS, A CORPORATION OF WEST VIRGINIA.

PRISMATIC FIREPROOF STRUCTURE.

SPECIFICATION forming part of Letters Patent No. 713,182, dated November 11, 1902.

Application filed May 27, 1899. Serial No. 718,590. (No model.)

*To all whom it may concern:*

Be it known that I, FRANK L. O. WADSWORTH, a citizen of the United States, residing at Allegheny, in the county of Allegheny and State of Pennsylvania, have invented certain new and useful Improvements in Prismatic Fireproof Structures, of which the following is a specification.

The advantages of inserting wires in the body of plate-glass to make the latter fireproof are well known. The illuminating effects that can be secured by the use of prismatic glass are also well known; but heretofore no effort has been made to produce a fireproof prismatic illuminator plate or panel with embedded wires, partly because of the fact that embedded wires in connection with prisms deflect the light-rays and alter the direction in which they pass to the prisms or to the reflecting-faces, so that the desired effect of the prisms is interfered with.

The object of my invention is to secure all the advantages from the use of prismatic illuminators with the fireproofing effect of the wires, and this I effect by arranging the wires in what I term the "neutral" portions of the said illuminators, as fully set forth hereinafter and as illustrated in the accompanying drawings, in which—

Figure 2:
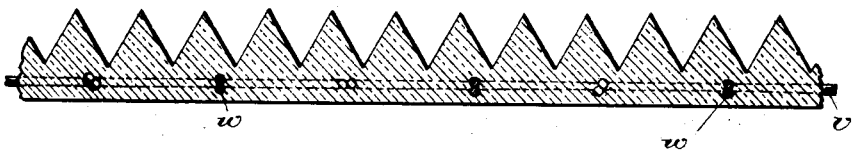
Figure 1:
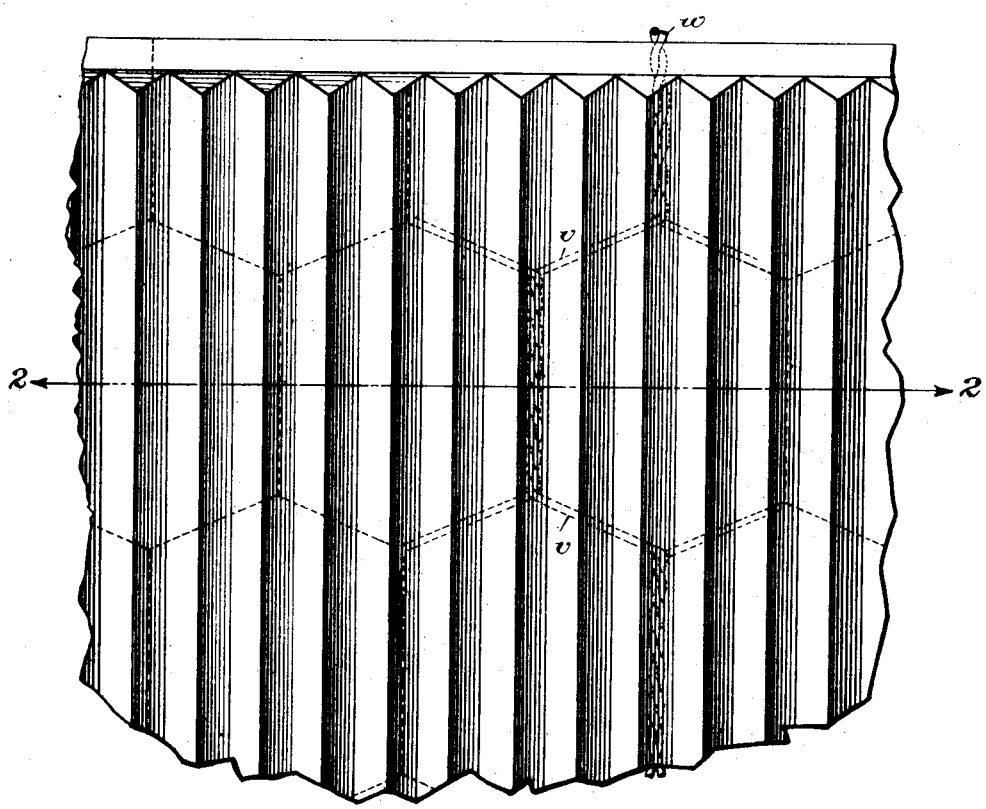
Figure 4:
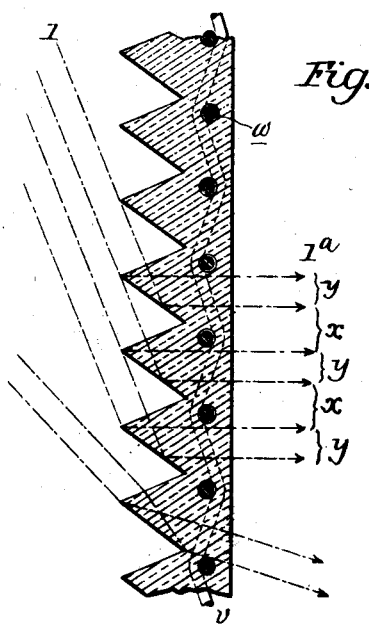
Figure 3:
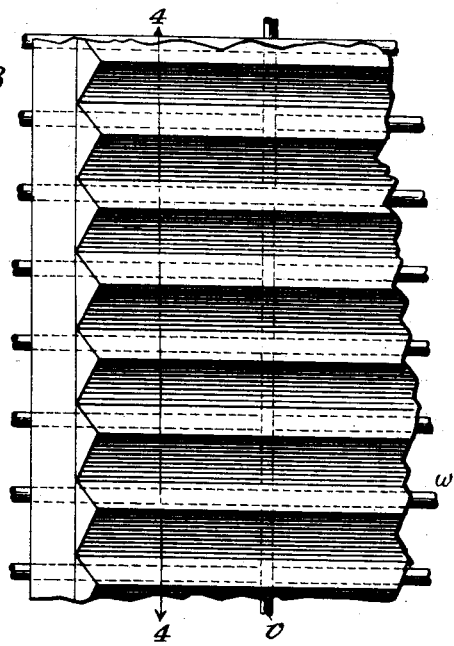
Figure 6:
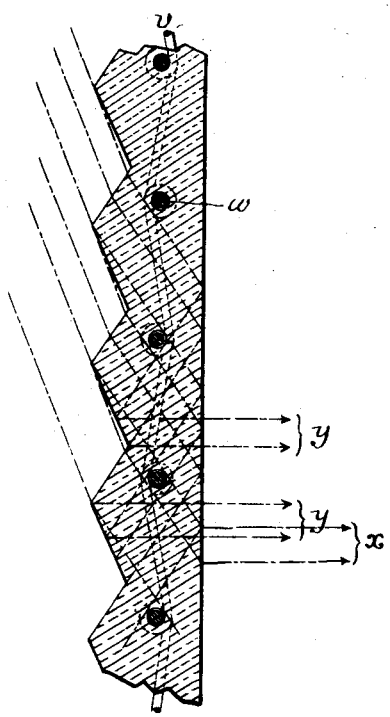
Figure 5:
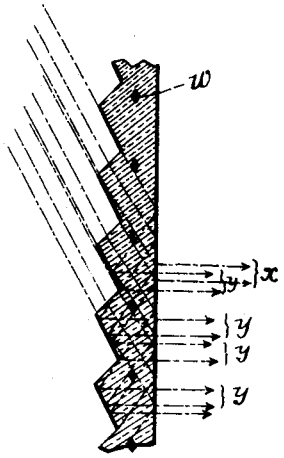

Figure 1 is a face view of part of an illuminating plate or panel embodying my invention; Fig. 2, a section on the line 2 2, Fig. 1; Fig. 3, a face view of part of a structure having wires differently arranged; Fig. 4, a section on the line 4 4, Fig. 3; Figs. 5 to 12, sectional views showing different forms of illuminators and different arrangements of wires or bars.

In every prismatic illuminator there are certain portions of the structure through which the rays of light from the principal source or principal light-rays do not pass. The situations of these portions depend upon the character of the structure and the direction of the principal light-rays. Thus in the different figures of the drawings the principal light-rays are indicated by the lines 1, which are deflected to a greater or less extent on passing into the structure and are projected therefrom in the direction $1^a$, as indicated in the drawings. It will be seen, however, that while the entire mass of principal rays enters the structure on the receiving-face it does not pass through and leave the same in one mass, but is divided into bundles $y$ in a manner too well known to need description, so that between the parts traversed by said bundles of rays there are parts of the structure which are not in the path of any of these principal rays, which parts I term the "neutral" portions of the structure. In these neutral portions of the structure, either within or outside of the body of the same, I arrange the transverse wires or bars $w$ parallel to the prisms and which impart the fireproofing characteristics to the structures, so that I am thus enabled to secure these fireproof effects without the loss of light which would ensue if the wires or bars were otherwise arranged. The said wires $w$ may be used alone, as shown in Figs. 5, 8, 9, 10, 11, and 12, or with vertical cross-wires, as in Figs. 3, 4, 6, 7, or the two may be twisted together to form a mesh, as in Figs. 1 and 2, the vertical wires $w'$ in no case affecting the action of the prisms. The wires or bars may be of different shapes in cross-section, as shown in the different figures, and they may be embedded in the body of the structure, as in Figs. 1 to 6, or in the prisms, as in Figs. 9 and 11, or cemented in recesses in the faces of the prisms, as in Fig. 8, or they may be cemented upon the face of the structure between the prisms, as in Figs. 7, 10, and 12; but in each case the wires or bars $w$ and the cementing material when used will lie in the neutral portions $x$ of the structure out of the paths of the principal light-rays.

In the case of the use of wire mesh, as in Figs. 1 and 2, the thicker portions resulting from twisting the wires together constitute the bars $w$, which are parallel to the prisms and in the neutral parts.

In the structures of Figs. 7, 8, 10, and 12 the wires $w$ are cemented in place on the emergence face by the use of any desired cement, as by a fusible cement or enamel, the faces of which in some instances, as in Fig. 12, constitute reflecting-faces. In Fig. 10 the enamel is transparent and the faces of the bars are reflecting-faces.

I claim as my invention—

1. A prismatic illuminating structure having wires embedded parallel to the prisms in the neutral parts of the structure, substantially as described.

2. The combination in a prismatic illuminator of a series of prisms and a series of wires inclosed in the neutral parts of the structure, and a second series of wires embedded in the structure at an angle to the first set, substantially as described.

3. A prismatic illuminator having wires cemented at the emergence face of the structure at the neutral parts thereof, and a second series of wires embedded in the structure, at an angle to the first set, substantially as described.

4. A prismatic illuminator having grooves at the emergence face with wires cemented therein, said grooves being different from those formed by the reëntrant faces of the prisms elements themselves, substantially as described.

In testimony whereof I have signed my name to this specification in the presence of two subscribing witnesses.

FRANK L. O. WADSWORTH.

Witnesses:
W. CLARENCE DUVALL,
J. P. FAIRGRIEVE.